Dec. 20, 1966  A. VACCARO  3,292,469
LIGHT-RESPONSIVE INSPECTING AND SEGREGATING
APPARATUS FOR SHEETS
Filed July 23, 1964  3 Sheets-Sheet 1
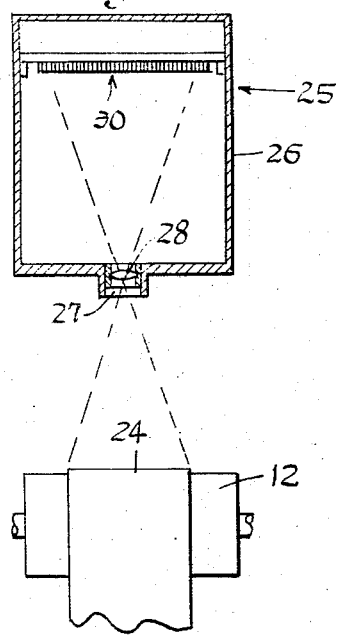
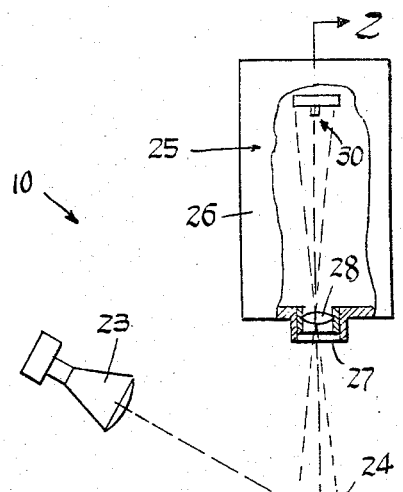
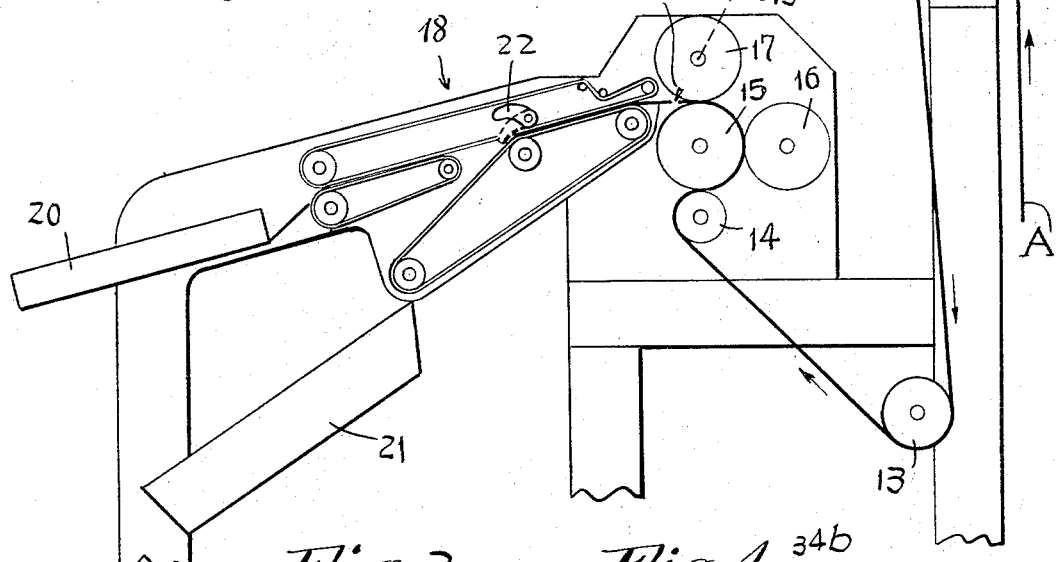
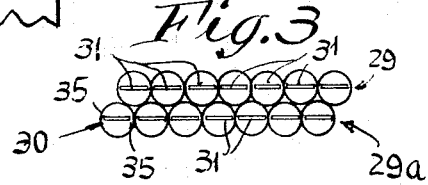
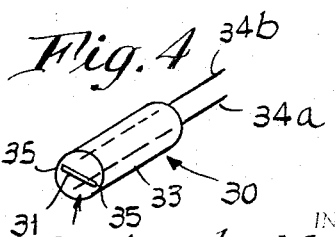
INVENTOR.
Angelo Vaccaro
BY
Johnson and Kline
ATTORNEYS

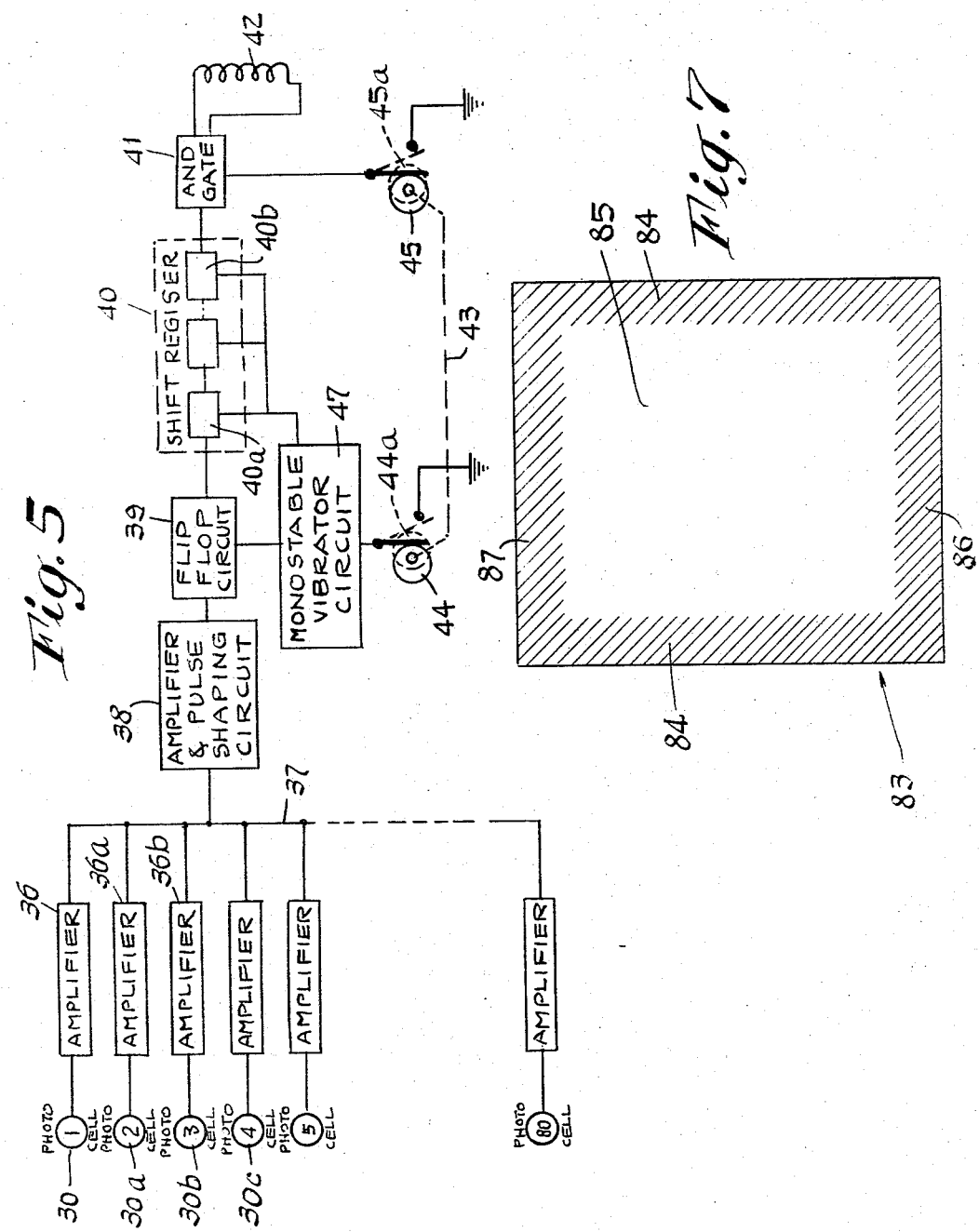

INVENTOR.
Angelo Vaccaro
BY
Johnson and Kline
ATTORNEYS

United States Patent Office 3,292,469
Patented Dec. 20, 1966

3,292,469
LIGHT-RESPONSIVE INSPECTING AND SEGRE-
GATING APPARATUS FOR SHEETS
Angelo Vaccaro, Port Washington, N.Y., assignor to Co-
lumbia Ribbon and Carbon Manufacturing Co., Glen
Cove, N.Y., a corporation of New York
Filed July 23, 1964, Ser. No. 384,684
18 Claims. (Cl. 83—80)

The present invention relates to an apparatus for inspecting a moving web of material to detect defects and to cutting the web of material into sheets and segregating the sheets according to their having no defects and are thus acceptable or have at least one defect and thus are unacceptable.

It has heretofore been suggested that a continuous moving web of material may be automatically scanned to be inspected for defects by the use of light-responsive sensing devices so that a defect will cause a change in the amount of light received by the light-responsive devices. These devices are generally positioned transversely of the web and thus a lineal width of the web is continuously scanned as the web moves. The sensing devices have included at least one photo-responsive device, such as a photo-conducting or photoelectric cell, and the inspection consists of utilizing the change in the light received by the cell when a defect occurs in the portion of the web being scanned as compared to the normal amount of light received when a defect is not present. The cell changes its electrical characteristics with a change in the amount of light received and by the use of appropriate electric circuits the change may be made to operate devices, such as a counter or a web stopping mechanism.

While in many instances such devices may have been found satisfactory, they have heretofore been unable to detect defects that are quite small and may be on the order of a relatively dark spot 1/32 of an inch in diameter. This is partly true when the web is of substantial width and thus the incremental width of such a spot is only a very small percentage of the total width of the web. Though a small change in the electrical characteristics of the web may be detected by sufficiently sensitive electric circuits, small changes would also be caused by other factors than by defects as for example, by a small change in the amount of illumination and hence the inspecting apparatus would indicate the existence of defects when in fact they would not be present. Thus the inspecting apparatus would be rendered so sensitive that it would malfunction and, when used in apparatus that segregates cut sheets into acceptable and unacceptable containers, direct acceptable sheets into the unacceptable container.

It is accordingly an object of the present invention to provide a light-responsive inspecting apparatus which is capable of detecting small sized defects in a moving web of material that may have substantial width.

Another object of the present invention is to achieve the detection of small defects with a light-responsive inspecting apparatus that is substantially insensitive to conditions other than defects thereby substantially minimizing the probability of malfunctioning.

A further object of the present invention is to provide a machine for cutting a web into sheets, for detecting each sheet which has at least one defect therein by inspecting the sheet prior to it being cut from the web and for segregating the sheets without defects and sheets with defects into separate containers.

Still another object of the present invention is to provide a light-responsive inspecting apparatus which is capable of indicating for each incremental length of a continuous web the existence of one or more defects in each length and for being able to be rendered insensitive to defects existing in the portion of the web which becomes the initial portion of each sheet.

An additional object of the present invention is to provide an apparatus which achieves the above object and yet is relatively economical to manufacture, durable in use and consists of inexpensive, reliable components.

In carrying out the present invention a feature thereof resides in a machine which accepts a moving web of material, such as paper, and cuts the web into sheets of substantially constant length. The web is convexly curved over a scanning roller that extends transversely of its length and light is directed onto the curved, exterior surface of the web to illuminate a transverse width thereof, and positioned to receive reflected light from the illuminated area of the web, is a photo-responsive means. The area in which the web is scanned is substantially remote from the position where the web is cut into sheets by a length of the web that is greater than the length of a sheet. Associated with the photo-responsive means is a delay circuit which stores the information that a defect exists in a portion of the web until that portion of the web is cut into a sheet that contains the defect at which time the delay circuit is caused to operate the machine to direct the movement of the defect containing sheet ino the unacceptable container. Without the presence of a signal, the sheet would normally pass into the acceptable container.

A further feature of the present invention resides in the photo-responsive means which is capable of inspecting the web and detect the presence of a relatively dark spot having a width of only 1/32 of an inch. This is achieved by utilizing a plurality of photo-responsive devices, each of which has a center portion that is photo-responsive and outer portions which are non-photo-responsive with the photo-responsive portion being of relatively small length, such as 3/16 of an inch. There is provided in the specific embodiment of the invention herein disclosed at least as many photo-responsive cells as the width of the web to be scanned divided by the length of the photo-responsive portion of the cell. The cells are mounted in two rows extending transversely of the sheet with one row being slightly misaligned with respect to the other row in the direction of movement of the web so that the photo-responsive portion of each cell in one row is aligned with the non-photo-responsive portions of the cells in the other row. In this manner the photo-responsive means scans instead of just one transverse line across the web, two transverse lines, each of which is intermittent.

By the use of the photocells mounted in this manner and by the use of photocells having only small sensing areas even small width defects will effect a relatively large percentage of change in the electrical characteristics of each photocell and accordingly the photo-responsive means is rendered substantially immune to slight changes caused by other factors than defects in the web. Moreover, by reason of being capable of detecting small size defects, the speed of the moving web may be susbtantially increased without the photo-responsive means failing to detect a defect.

Other features and advantages will hereinafter appear.

In the drawing:

FIGURE 1 is a diagrammatic representation of the light-responsive inspecting and segregating apparatus for sheet material of the present invention.

FIG. 2 is a section taken on the line 2—2 of FIG. 1.

FIG. 3 is a view of a plurality of photo-responsive cells showing the relationship therebetween.

FIG. 4 is a perspective view of a photocell of the type which may be used in the present invention.

FIG. 5 is a block diagram of the electrical circuitry of the light-responsive means utilized in the present invention.

FIG. 7 is a plan view of a sheet which may be scanned by the apparatus of the present invention.

Figure 6:
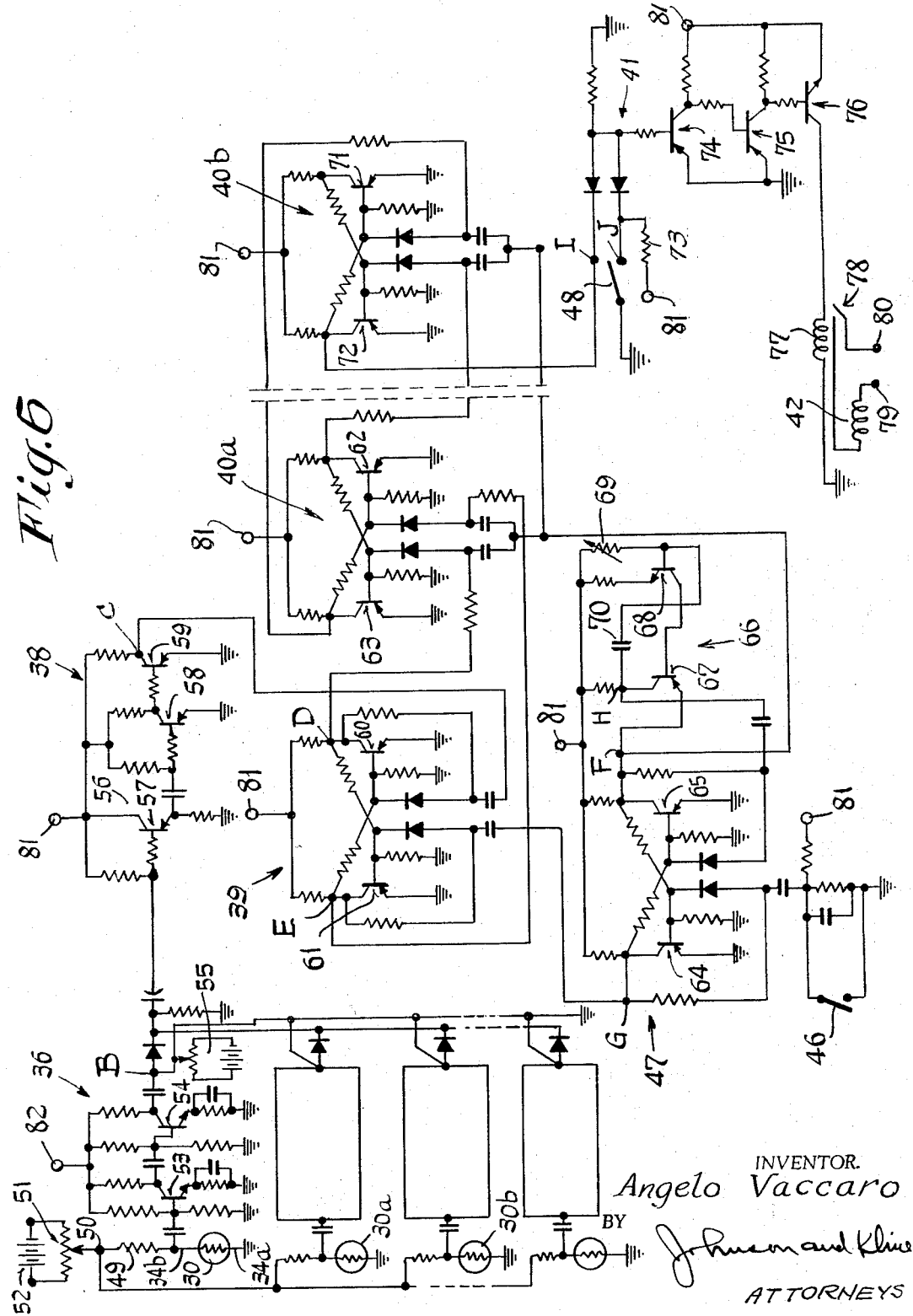
FIG. 6 is a schematic diagram of the electric circuitry.

Referring to the drawing, the apparatus of the present invention is generally indicated by the reference numeral 10 and a web, i.e. continuous length of sheet material such as coated paper, is indicated by the reference numeral 11. The web traverses from a point A from which it may be removed from a rotatably mounted roll (not shown) over a peripheral arc of a scanning roller 12 and other rollers 13, 14, 15, 16 and 17 to a feed belt mechanism, generally indicated by the reference numeral 18. The roller 17 carries a knife 19 and upon each revolution thereof cuts the web in sheets of predetermined length with the sheets passing onto the belt mechanism 18. The mechanism 18 directs each sheet either into an aceeptable container 20 or an unacceptable container 21, the former containing sheets which do not have a defect while the latter contains sheets in which each sheet has at least one defect that has been automatically sensed and therefore is not of the desired commercial quality.

The belt mechanism 18 and containers 20 and 21 are arranged to have each sheet normally pass into the acceptable container 20 by a finger 22 normally being in its solid line position shown. The finger 22 is pivotally mounted and upon it assuming its dotted line position, it will engage the forward end of a sheet and direct it into the unacceptable container 21. The movement of the finger 22 is preferably electrically controlled as a solenoid, as will be hereinafter more fully set forth.

The top peripheral portion of the scanning roller 12 is illuminated by at least one electric bulb, indicated by the reference numeral 23 though any number may be employed if desired. The bulb is energized in a manner, as by D.C. or polyphase A.C., to provide a substantially constant value of illumination on a transverse area 24 of the web. The area 24 is the top peripheral portion of the roller 12 and the light, as shown, is directed at a relatively sharp angle thereto, 30 degrees from the horizontal having been found desirable for reasons which will be hereinafter apparent. Positioned above the illuminated area 24 of the web surface on the scanning roller is a photo-responsive means, generally indicated by the reference number 25. The photo-responsive means includes a housing 26 having an aperture 27 in which a lens 28 is positioned. The lens directs the light reflected from the area 24 to within the container and more particularly to the photo-sensitive portions of two rows 29 and 29a of photocells 30. It will be understood that the portion of the web illuminated is convexly curved and that the light reflected to the lens is substantially radial of the roller 12. Moreover, the direction of the light from the bulb 23 makes a smaller angle (30 degrees having been found satisfactory) with a tangent to the area 24 than the angle between the light from the bulb and the light reflected to the photocells 30.

In the specific embodiment of the invention herein described, it being appreciated that other and different photocells may be used, the photocell 30 shown in FIG. 4 particularly is a cadmium sulphide photo-conductive cell in which the cadmium sulphide is deposited in a thin line 31 across the end face 32 of a cylindrical glass tube 33 that constitutes the closed container of the cell. Leads 34a and 34b extend from the cell and the cadmium sulphide photo-receptive portion is positioned in series between the leads 34a and 34b and will have a resistance dependent upon the light received thereby. The end face 32 has adjacent the end of the photo-responsive line 31, non-photo-responsive portions of the cell with the latter lengths being aligned with the line 31 and indicated by the reference number 35. While photo-conductive cells are disclosed having a linear photo-responsive line 31, it will be appreciated that cells having circular photo-responsive areas may be used with only, if desired, a linear portion thereof being employed.

Each of the cells 30 is mounted to have its photoresponsive end face 32 be directed towards the lens 28. Preferably, the distance from the surface of the web in the area 24 to the lens is equal to the distance from the lens to the end faces of the cells 30 and thus the lens has a one to one ratio. Of course it will be appreciated that, if desired, a different ratio may be employed to change the width which each photocell scans or is responsive to and thus vary the size of the defect which would be detected and also to vary the total width of the area to which a determined number of cells may scan. Thus the photo-responsive means may be rendered more sensitive by decreasing the distance from the lens to the cells and if made one-half of the present one to one ratio, then each cell would scan an incremental width only half as great as the prior incremental width of the web thus enabling a dark spot one-half the size of that previously detected as a defect to be detected as a defect.

It will be noted from FIG. 3 that the two rows 29 and 29a of the cells are parallel with the photo-responsive line 31 of each cell being aligned transversely of the web with the other photo-responsive lines of the other cells in its row. Moreover, the line 31 of each cell is in alignment with respect to the direction of movement of the web, with at least the non-photo-responsive areas 35 of the adjacent cells in the other row. The photo-responsive line 31 is preferably slightly longer than two adjacent non-photo-responsive areas 35 to assure complete scanning of the area 24 and with this preferred structure a defect may affect a cell in both rows.

As shown in FIG. 5, each of the photocells 30 is connected to its own amplifier 36, 36a, 36b etc. for photocells 30a, 30b etc. respectively with the output of the amplifiers being connected in parallel to a common lead 37. Lead 37 is connected to an amplifier and pulse shaping circuit 38 with the output thereof operating a flip-flop circuit 39. As pointed out previously, the area sensed 24 is spaced from the reject finger 22 a distance which is greater than the length of one sheet and in order to preserve the information of a presence of a defect in the web at the area 24 until the sheet having the defect becomes cut, there is provided a delay means. While the delay means may be of the mechanical type such as an intermittent wheel having movable pins that actuate switches, in the embodiment of the invention disclosed herein, the delay means is specifically a plurality of flip-flop circuits connected as a shift register and generally indicated by the reference numeral 40. There are as many flip-flop circuits in the shift register as the number of sheets which would occupy the length of the web between the area 24 and finger 22 and while only three have been shown, it will be appreciated that more may be employed.

The beginning shift register circuit 40a is connected to the flip-flop circuit 39 and shifts its state to the state of the circuit 39 for each sheet and also transfers is information to the subsequent shift register circuit with each sheet so that the information for the portion of each sheet scanned in the area 24 is transferred to the final shift register circuit 40b at approximately the same time as the sheet is at the belt mechanism 18. An "and" gate circuit 41 is connected to operate a solenoid 42 which when energized functions to pivot the reject finger 22 from its solid line position to its dotted line position.

The flip-flop 39 and the shift register 40 are each set to operate every time a length of the web moves past the area 24 that is equal to the length of a cut sheet. To this end there is provided on a shaft 43 which drives the roller 17 a pair of cams 44 and 45. It will be appreciated that one revolution of the shaft 43 passes a length of the web that is the same length of one sheet. The high spot 44a of cam 44 serves to close a normally open switch 46 which energizes a monostable vibrator circuit 47 that is connected to the flip-flop 39 to cause it to assume its normal state if it is not already in such a condition. In addition, the vibrator circuit 47 causes a sequential advancement of the information in the shift register from one circuit to the next.

The vibrator circuit 47, as will be hereinafter appreciated, effects the change of the shift register prior to the change of the flip-flop 39 such that the beginning shift register 40a will be in a condition to receive the information from the flip-flop 39 prior to the changing of state of the flip-flop 39 to its normal state. The other cam 45 has a high point 45a which closes a normally open switch 48 and serves as the other input to the "and" gate circuit 41 at a particular rotative angle of the shaft 43, thus setting the time when the solenoid 42 will operate the finger 22. The time may be adjusted by shifting of the high spot of the cam rotatively on the shaft 43 thereby assuring that the finger 22 will be, if a defect containing sheet is entering the belt mechanism 18, in its dotted line position to thus engage the forward edge of the defect containing sheet and direct it into the unacceptable container 21.

It will be understood that the photo-conductive cells 30 normally receive sufficient light to render them of low resistance between their leads 34 and 35 while the presence of a defect will decrease the light received thereby, thereby increasing the resistance of the photo-conductive cell. The change in resistance of one cell provides to the amplifier circuit 36 of the cell a signal which is carried through the amplifying and pulse shaping circuit 38 to the flip-flop circuit 39 to change its state. This information is subsequently transferred to the initial circuit 40a of shift register 40 and carried therethrough to the "and" gate circuit 41 where it effects operation of the solenoid 42 at the proper time to direct the sheet to the unacceptable container. Moreover, it will be understood that each of the photocells 30 is independent of one another and thus is responsive only to the incremental width of the web which is reflected on the end face of the cell. Thus each cell can cause a change in the state of the flip-flop circuit 39 irrespective of the other cells but only one defect, the first detected, effects the change.

Referring specifically to FIG. 6, the electrical schematic diagram of the present invention, previously mentioned elements are indicated by the same reference character. The initial photocell 30 has one lead 34a connected to ground and its other lead 34b connected through a resistance 49 to a tap 50 of a variable potentiometer 51 that is connected across a direct current source, such as a battery 52. The position of the tap 50 sets the voltage across each cell 30 and thus serves as one method of setting the sensitivity, i.e. size of dark spot detected, by each cell. The amplifier circuit 36 for the cell 30 includes a pair of transistors 53 and 54 which amplify a pulse consisting of a change from a low to a high positive voltage that occurs when the cell 30 detects a defect by a decrease in illumination received thereby which increases its resistance. The positive pulse increases the conduction of the transistor 53 and decreases the conduction of the transistor 54 producing at the point B a positive pulse of greater magnitude. This pulse is then compared against a determined value of negative potential produced by a bias circuit, generally indicated by the reference numeral 55. The circuit 55 effects control of the minimum voltage value of a pulse which passes beyond it to serve as an indication of the existence of a defect and by the setting of the value of the bias circuit voltage, the value of the minimum pulse is set. Preferably it is set to minimize the effect of changes in external factors which include the value of illumination, difference in paper roughness etc.

The sum of the voltage value of the pulse at the point B less the voltage valve of the bias circuit 55 is a sum voltage signal which is then introduced into the amplifier and pulse shaping circuit 38 that includes an emitter-follower circuit 56 having a transistor 57 and pulse shaping transistors 58 and 59. The output of the circuit 38 upon the indication of a defect, consists of a positive pulse having a voltage that changes from a negative value to a less negative value having approximately the potential of the ground at the point C by the defect indicating pulse from the amplifier 36 causing a decrease of conduction of the transistors 57 and 58 and an increase of conduction of the transistor 59.

The positive pulse at the point C is then introduced to the flip-flop circuit 39, a base triggered bistable flip-flop circuit that includes a normally conducting (on) transistor 60 and a normally nonconducting (off) transistor 61. A positive pulse appearing at the base of the transistor 60 causes it to cease conduction while the transistor 61 is rendered conducting thereby changing the state of the circuit 39. At the point D thereof a negative pulse will then appear while at the point E, a positive pulse will then appear. The change in state of the circuit 39 is transferred to the initial shift register flip-flop circuit 40a, also a base triggered bistable flip-flop circuit as are the other shift register circuits. The circuit 40a has a normally conducting (on) transistor 62 and a normally nonconducting (off) transistor 63. A positive pulse from the point E changes its state substantially simultaneously with a change in state of the circuit 39 and thus the state of the flip-flop circuit 40a is maintained the same as the condition or state of the circuit 39.

Upon the passage through the scanning area of a length of web equivalent to a sheet, the switch 46 closes and actuates the monostable vibrator circuit 47. This circuit has an "on" transistor 64 and an "off" transistor 65 with the closure of the switch 46 causing these two transistors to change their state producing at the point F a positive pulse that is transmitted to each circuit in the shift register 40. The pulse causes the initial circuit 40a to assume its normal state with each of the other circuits in the shift register being caused to assume the state of the previous circuit in the shift register. In the diagram only the initial and final circuits 40a and 40b are shown and thus the state of circuit 40b is shifted to that of 40a upon the appearance of the positive pulse or voltage from the point F in a manner well known in the art. The change in state of the monostable vibrator circuit 47 from transistor 65 being changed from "off" to "on," while producing a voltage change at the point F, also produces at the point G thereof, which is connected to the circuit 39, a negative pulse which has no effect on the state of the circuit 39.

In accordance with the present invention the circuit 39 is delayed in assuming its normal state, by the monostable vibrator circuit including an adjustable RC time delay network, generally indicated by the reference numeral 66 and having transistors 67 and 68, an adjustable resistor 69 and a condenser 70. The network 66 delays the change in state from the transistor 65 conducting to the transistor 64 conducting by controlling the duration of conduction of the transistor 65 until it is made nonconducting by the applying of a triggering pulse to its base. Thus when the transistor 65 is initially rendered conducting, the transistors 67 and 68 are initially nonconducting and condenser 70 is uncharged. The rate of charge of the condenser 70 is controlled by the resistor 69 and it continues until it has sufficient value to effect conduction of the transistor 68 which then renders the transistor 67 conducting. At the point H a positive pulse is produced which is applied to the base of transistor 65 to shift the state of the monostable vibrator circuit 47 to its initial state where transistor 64 is "on." When the transistor 64 is turned "on," a positive pulse is transmitted to the base of transistor 61 of the circuit 39 from the point G which is sufficient to cause the circuit 39, if the transistor 61 is "on" to shift its state to have transistor 60 "on." Naturally, if transistor 60 is conducting then no change in state is effected, as the desired state is already present.

It will be appreciated that the delay circuit enables the shift register to be shifted prior to the flip-flop circuit 39 being made to assume its normal state and thus the information in each shift register circuit is passed to its subsequent circuit and the state of circuit 39 is passed to the circuit 40a. Upon the circuit 39 assuming its normal state it is in condition to receive an indication of the existence of a defect in the subsequent portion of the web which constitutes the next sheet.

Whenever the end shift register 40b is in a condition that indicates a defect, i.e., when transistor 71 is "off" and transistor 72 is "on," the information is supplied to the "and" gate 41. The "and" gate includes a point I connected to the collector of transistor 72 and a point J connected through switch 48 and resistor 73 to the ground with both points being connected in parallel to the base of a transistor 74. The transistor 74 is normally conducting which renders amplifying transistor 75 and power transistor 76 associated therewith normally nonconducting. With the transistor 72 conducting the point I is effectively at ground potential and is ineffective until the switch 48 is closed, at which time a relatively positive potential is applied to the base of the transistor 74 causing it to cease conduction and causing conduction of amplifying transistor 75 and power transistor 76. Upon the conduction of transistor 76, a relay 77 becomes energized to close a relay switch 78 which closes a circuit, connectible to a source of appropriate electrical energy through the terminals 79 and 80, to the solenoid 42. The finger 22 is thus pivoted to its dotted line position and serves to deflect the unacceptable sheet into the unacceptable container 21.

Upon the switch 48 being opened, the transistor 74 is rendered conducting and 76 nonconducting thereby deenergizing the relay 77 and the solenoid 42. The time with respect to the knife 19 which controls the position of the leading edge of a cut sheet when the fingers will pivot may thus be controlled by the position of the raised portion 45a of the cam 45 with respect to the shaft 43 and the extent of the raised portion controls the duration that the solenoid 42 will be energized and the finger 22 pivoted.

The transistors employed are generally of the "PNP" type as shown and the circuit is energized at terminals 81 by a negative voltage while at terminal 82 by a positive voltage.

From the foregoing it will be understood that a defect consisting of a small, relatively dark spot may sufficiently change the resistance of one cell to cause actuation of the flip-flop circuit 39. Also, a corresponding change in resistance may occur when a larger spot of less blackness or darkness is present in the area. In both instances, the total light reflected to the cell is the same, the former having more darkness over a smaller length while the latter has lesser darkness over a larger area. Thus, the present invention may also be employed to detect a defect which consists of a surface roughness greater than that which is acceptable by reason of the bulbs directing light on the area 24 at a substantially obtuse angle with respect to the light reflected to the photocells 30 and thus roughness will, in effect, create shadows which would appear to the cells 30 as an area or spot of darkness. Such roughness could include, where the sheet material is paper, a small wood chip that may be upstanding from the surface of the web.

Shown in FIG. 7 is a sheet 83 of material which may be inspected and cut from a web by the present invention. One example of such a sheet is a hectograph plate consisting of a paper backing having a light colored coating thereon with the coating surface being the scanned surface. In such a sheet, it has been found that defects which are present in the cross-hatched side edge portions 84 do not render the sheet unacceptable, though such would if present in the interior portion 85. To prevent causing a sheet having "defects" in the side edge portion to be directed into the unacceptable container 21, the width of the area of the web may be altered to prevent scanning the edge portion by means of the lens 28 or by eliminating from the circuit the cells which scan the side edge portion.

The sheet 83 also may have "defects" in its leading edge portion 86 or its trailing edge portion 87 which again do not render the sheet unacceptable. The present invention enables such a sheet to be directed to the acceptable container 20, by the use of the time delay circuit including the adjustable resistance 69 in the monostable vibrator circuit 47 which controls the duration and hence the length of the web which is not scanned. Thus, by adjusting the resistance 69, the total length of the two portions 86 and 87 that is not scanned may be set and also by adjustment of the cam 45, the relative lengths therebetween may also be set. Naturally, if it is desired to scan the complete length of the sheet without scanning the lengths of the portions 86 and 87 then the monostable vibrator is caused to be substantially instantaneously actuated instead of being delayed actuated.

It will be appreciated that the light-responsive means may also be used with a counting device operated by the flip-flop circuit 39 instead of the shift register, finger 22 and associated components to count the number of sheet lengths of the web which have at least one defect. An indication of the quality of the web for defects instead of cutting the web into sheets would thus be provided with the sheet length being any convenient length of the web.

It will accordingly be understood that there has been disclosed an apparatus for cutting a web of material into sheet lengths that includes a photo-responsive inspecting means. The web is thus scanned for defects, and if one occurs for each sheet length of the web, then it is detected by the photo-responsive means which issues a signal. The signal is stored in a storage means until the sheet length containing the defect is cut, at which time the sheet is then directed into an unacceptable container. If a sheet has no defects it is directed into an acceptable container, and thus the present invention provides for cutting sheets from a web and segregating them into acceptable and unacceptable containers.

A defect that may be detected by the photo-responsive means may be a relatively dark spot having a transverse width on the order of $\frac{1}{32}$ of an inch. This is accomplished by the use of a plurality of photocells, each being responsive to light reflected from only a small increment of width of the web and by mounting the photocells in two rows transversely of the web, the complete width of the web is thus scanned. Moreover, by the use of a plurality of photocells the photo-responsive means is rendered quite insensitive to factors other than defects and thus minimizes the possibility of external changes being detected by it as a defect and causing a sheet without a defect to be directed into the unacceptable container.

Variations and modifications may be made within the scope of the claims and portions of the improvements may be used without others.

I claim:

1. A photo-responsive inspecting apparatus for detecting defects in a continuously moving web of material comprising means for directing illumination onto an area that extends transversely to the moving web and a photo-responsive sensing means positioned to receive illumination from the portion of the web in the area, said means including a plurality of photo-responsive cells with each having photo-responsive and non-responsive portions, means mounting the cells in two rows transversely of the web with their photo-responsive portion being mounted to receive illumination from the web, one of said rows being displaced longitudinally of the web from the other with the photo-responsive portions of the cells of one row being aligned in the direction of the moving web with the non-responsive portions of the cells in the other row.

2. A photo-responsive inspecting apparatus for detecting defects in a continuously moving web of material comprising means for directing illumination onto an area that extends transversely to the moving web and a photo-responsive sensing means positioned to receive illumination from the portion of the web in the area, said means including a plurality of photo-responsive cells with each having photo-responsive and non-responsive portions, means mounting the cells in two rows transversely of the web with their photo-responsive portions being mounted to receive the illumination from the web, one of said rows being displaced longitudinally of the web from the other with the photo-responsive portions of the cells of one row being aligned in the direction of the moving web with the non-responsive portions of the cells in the other row, said photo-responsive portion of each cell extending transversely of the web and there being sufficient cells to enable each cell to receive illumination from only a small incremental transverse portion of the web.

3. The invention as defined in claim 2 in which each photo-responsive cell includes a substantially elongate photo-conductive element having a resistance which varies with the light received thereby and in which the elongate element is not greater than ten times the transverse width of a defect in the web to be detected.

4. The invention as defined in claim 2 in which the photo-responsive portion of each cell is a substantially elongate element and is positioned to extend transversely of the web with the elements of all cells in a row being substantially in alignment.

5. The invention as defined in claim 4 in which the longitudinal distance between the two rows of elements approximates the length of an elongate element of a cell.

6. A photo-responsive inspecting apparatus for detecting defects including surface irregularities in a continuously moving web of material comprising means for directing illumination on an area that is transverse to the longitudinal movement of the web and is convexly arcuate longitudinally of the web, and a photo-responsive sensing means positioned to receive illumination reflected radially from the portion of the web in the area, the angle between the direction of illumination on a tangential line to the area being less than the angle between the direction of illumination and the light reflected to the photo-responsive means whereby surface irregularities effect the light received by the photo-responsive means.

7. The invention as defined in claim 6 in which there are means for moving the web that includes a cylindrical roller extending transversely of the web, said web engaging a peripheral arc of said roller with the area of the web illuminated being that which engages the arc of the roller.

8. A photo-responsive inspecting apparatus for detecting defects in a continuously moving web of material comprising means for directing illumination on an area that extends transversely to the moving web, a photo-responsive sensing means positioned to receive illumination reflected from the portion of the web in the area, said means including a plurality of photo-responsive cells with each having a photo-responsive portion, means mounting the cells transversely of the web with their photo-responsive portion mounted to receive the reflected illumination, means for connecting the cells in parallel to each other and to an output at which a signal indicative of a change of light received by any cell appears, and means for adjusting the value of the signal.

9. The invention as defined in claim 8 in which all cells are photo-conductive cells and the last-named means includes an adjustable voltage source for controlling the voltage across each cell.

10. The invention as defined in claim 8 in which the last-named means includes an adjustable voltage source that provides an opposing voltage that is algebraically added to the signal to produce at the output a sum signal that is greater than the value of the opposing voltage.

11. A photo-responsive inspecting apparatus for detecting a defect in a sheet length of a continuously moving web comprising means for feeding the web past an area, means for illuminating said web transversely, photo-responsive means positioned to receive reflected illumination from the portion of the web in the area and to issue a signal upon the sensing of a defect, circuit means having one state and a second state connected to the photo-responsive means and operable by said means to shift its state from the one state to the second state upon receipt of a signal, storage means for storing the state of the circuit means, causing means for causing the storage means to store the state of the circuit means and for conditioning the state of the circuit means to the one state for each sheet length of material passing through the area, said causing means causing the storage means to store the state of the circuit means prior to the conditioning of the circuit means and in which the causing means includes an adjustable time delay means for adjusting the duration between causing the storage means to store the state of the circuit means and conditioning the circuit means to the one state, whereby defects in said web passing through the illuminated area during the duration are not stored in the storage means.

12. The invention as defined in claim 11 in which the causing means includes a monostable vibrator having a one state that causes the storage means to store the state of the circuit means and another state for conditioning the circuit means and an adjustable time delay means for controlling the duration of the one state of the causing means.

13. An apparatus for cutting a web of sheet material into sheets and for segregating the sheets having no defects from those having at least one defect comprising means for feeding the web past an area, means for illuminating said web transversely in said area, photo-responsive means positioned to receive reflected illumination from the portion of the web in the area and to issue a signal upon the sensing of a defect, cutting means for cutting the web into sheets, means for directing each sheet into a no defect container or a defect container, circuit means having one state and a second state connected to the photo-responsive means and operable by said means to shift its state from the one state to the second state upon receipt of a signal, means for shifting the circuit means to its one state for every sheet length passing through the area, and storage means connected to the circuit means and the directing means and having a one state and a second state, said state corresponding to the state of the circuit means prior to being shifted and being operable when said sheet length as a sheet is at the directing means to control the directing means to direct the sheet into the no defect container when in the one state and into the defect container when in the second state.

14. An apparatus for cutting a web of sheet material into sheets and for segregating the sheets having no defects from those having at least one defect comprising means for feeding the web past an area, means for illuminating said web transversely in said area, photo-responsive means positioned to receive reflected illumination from the portion of the web in the area, said means including a plurality of photo-conductive cells with each having an elongate linear photo-responsive portion and a non-photo-responsive portion, means mounting the cells in two parallel rows extending transversely of the web with the photo-responsive portions in one row being aligned in the direction of movement of the web with the non-photo-responsive portions of the cells in the other row, means interconnecting the cells in parallel to produce a signal upon the sensing of a defect by any one of the cells, cutting means for cutting the web into sheets, means for directing each sheet into a no defect container or a defect container, circuit means having one state and a second state connected to the photo-responsive means and operable by said means to shift its state from the one state to the second state upon receipt of a signal, means for shifting the circuit means to its one state for every sheet length passing through the area, and storage means connected to the circuit means and the directing means and having a one state and a second state, said state corresponding to the state of the circuit means prior to being shifted and being operable when said sheet length as a sheet is at the directing means to control the directing means to direct the sheet into the no defect container when in the one state and into the defect container when in the second state.

15. An apparatus for cutting a web of sheet material into sheets and for segregating the sheets having no defects from those having at least one defect comprising means for feeding the web past an area, means for illuminating said web transversely in said area, photo-responsive means positioned to receive reflected illumination from the portion of the web in the area and to issue a signal upon the sensing of a defect, cutting means for cutting the web into sheets, means for directing each sheet into a no defect container or a defect container, circuit means having one state and a second state connected to the photo-responsive means and operable by said means to shift its state from the one state to the second state upon receipt of a signal, means for shifting the circuit means to its one state for every sheet length passing through the area, and storage means connected to the circuit means and the directing means and having a one state and a second state, said state corresponding to the state of the circuit means prior to being shifted and being operable when said sheet length as a sheet is at the directing means to control the directing means to direct the sheet into the no defect container when in the one state and into the defect container when in the second state, said means for shifting also conditioning the storage means for rendering it capable of being corresponding to the next state of the circuit means, with the shifting of the circuit means being delay a predetermined time after the conditioning of the storage means.

16. An apparatus for cutting a web of sheet material into sheets and for segregating the sheets having no defects from those having at least one defect comprising means for feeding the web past an area, means for illuminating said web transversely in said area, photo-responsive means positioned to receive reflected illumination from the portion of the web in the area and to issue a signal upon the sensing of a defect, cutting means for cutting the web into sheets, means for directing each sheet into a no defect container or a defect container, circuit means having one state and a second state connected to the photo-responsive means and operable by said means to shift its state from the one state to the second state upon receipt of a signal, means for shifting the circuit means to its one state for every sheet length passing through the area, and storage means connected to the circuit means and the directing means and having a one state and a second state, said state corresponding to the state of the circuit means prior to being shifted and being operable when said sheet length as a sheet is at the directing means to control the directing means to direct the sheet into the no defect container when in the one state and into the defect container when in the second state, said storage means consisting of a shift register having a plurality of flip-flop circuits, there being as many flip-flop circuits as there are sheet lengths in the length of the web between the illuminated area and the cutting means.

17. A photo-responsive inspecting apparatus for detecting defects in a continuously moving web comprising means for directing illumination on an area that is transverse to the longitudinal movement of the web, a plurality of photo-responsive sensing means, means positioning said sensing elements in a row transverse to the web and spaced therefrom and means including a single lens positioned between the web and the row of sensing elements for directing an image of the area on the row of photo-responsive sensing means.

18. The invention as defined in claim 17 in which the row of photo-responsive sensing means is at least as long as the transverse area of the web to be inspected and the image formed by the lens on the row is of a width corresponding to the width of the area.

References Cited by the Examiner

UNITED STATES PATENTS

| | | | |
|---|---|---|---|
| 2,229,638 | 1/1941 | Chamberlin et al. | 83—106 |
| 2,546,831 | 3/1951 | Newell | 83—365 X |
| 2,732,896 | 1/1956 | Lundahl | 83—80 |
| 2,877,846 | 3/1959 | Tobey | 83—365 X |
| 3,013,459 | 12/1961 | Coleman | 83—375 X |
| 3,143,017 | 8/1964 | Donnell | 83—365 X |

FOREIGN PATENTS 78,823   8/1962   France.

WILLIAM S. LAWSON, *Primary Examiner.*